United States Patent Office 3,551,521
Patented Dec. 29, 1970

3,551,521
POLYPROPYLENE COMPOSITIONS CONTAINING POLYESTER AMINES
Walter W. Thomas, Wilmington, Del., assignor to Hercules Incorporated, Wilmington, Del., a corporation of Delaware
No Drawing. Filed June 13, 1968, Ser. No. 736,562
Int. Cl. C08f 29/10
U.S. Cl. 260—873          13 Claims

ABSTRACT OF THE DISCLOSURE

Polypropylene and other olefin polymers are modified by the addition thereto of a polyester resin containing tertiary amine groups. The polyester is present in an amount sufficient to provide 0.1 to 1% by weight of carbonyloxy group and 0.1 to 2% tertiary amine nitrogen. The additives improve light stability of the polymer and also contribute disperse and acid dyeability.

---

This invention relates to new compositions based on olefin polymers which exhibit a unique combination of properties not previously found in such polymers.

While polymers based on ethylene, propylene and other 1-olefins have become commercially important in recent years in fiber and film applications, their maximum utilization has not been realized due to their relative inertness to dyeing. For this reason, a substantial effort has been expended by virtually all producers of these polymers in the attempt to overcome this difficulty. Many different types of additives have been suggested for incorporation into the polymer as dyesites. Many surface treatment techniques have also been develop, as well as techniques for grafting polar, dye-receptive molecules onto the polymer backbone. Generally, these techniques have been limited to preparing a polymer composition useful in a specific dyeing method, i.e., acid dyeable, disperse, dyeable, etc.

A further well-known drawback of the olefin polymers has been their poor stability under the influence of light and heat. This problem has likewise commanded considerable attention from research workers in the field, and an impressive array of additives and treatments have been developed to alleviate this difficulty.

It has now been found possible, by use of a single additive, to impart excellent light stability, disperse dyeability and acid dyeability to polymers of 1-olefins. This unique combination of properties is provided by adding to the polymer a basic essentially linear polyester resin containing tertiary amine groups. The tertiary amine groups can be either a part of the linear polymer chain or they can be pendant groups attached to the linear polymer chain. Likewise, the tertiary amine groups can be included in either the acid or the alcohol moiety of the molecule, or in both.

The basic amino polyesters useful in this invention are condensation polymers which are substantially or completely insoluble in water and have a melting point below about 250° C. If the melting point exceeds about 250° C. the polymer composition containing the basic amino polyester becomes more difficult to shape. These polymers do not undergo any significant amount of cross-linking during extrusion, nor do they degrade significantly at polyolefin processing temperatures.

The fundamental condensation reaction by which linear polyesters are prepared is well known. An ester, preferably methyl, of a dicarboxylic acid is reacted with a diol in 1:2 mole ratio to form, by ester interchange, a terminal hydroxy ester of the dicarboxylic acid. The latter is then polymerized under influence of heat and vacuum and excess diol is stripped off.

To prepare the tertiary amine-containing polyesters useful in this invention, only slight variations of the conventional process are required. As stated above, either or both the acid and alcohol portion of the polyester molecule can contain the tertiary amine group. When the tertiary amine group is in the acid portion, the procedure described above is used. When the tertiary amine group is in the alcohol portion, the procedure is modified to the extent that in the initial step where the dicarboxylic acid ester is reacted with the diol, the diol is a 1 to 1 molar mixture of a relatively low boiling glycol, preferably ethylene glycol, and the higher boiling amino diol. When the resulting hydroxyester is polymerized, the lower boiling glycol is removed. This procedure offers the advantage of working at lower temperatures as well as an economic advantage since the amino diols are usually more expensive than the more conventional glycols.

Any diol and dicarboxylic acid combination can be employed in the instant invention subject to these limitations: (a) the dicarboxylic acid groups must be separated by a minimum of 2 carbon atoms, (b) the hydroxyl groups of the diol must be separated by a minimum of 2 carbon atoms; and (c) the hydroxyl groups must be separated from the amine nitrogen by at least two carbon atoms.

Diols containing tertiary amines which can be employed include, inter alia, such compounds as:

(a)
$$HOR-\underset{R_1}{\underset{|}{N}}-R-OH$$

(b)
$$HO-R-CH_2-R-OH$$
$$\underset{R_1\ \ R_1}{\overset{N}{\diagdown}}$$

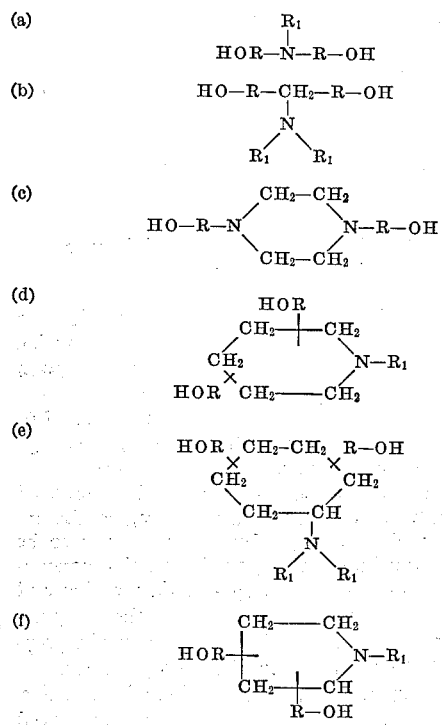

where R is an aliphatic radical of about 2 to 13 carbon atoms and $R_1$ is an aliphatic, aromatic or heterocyclic radical, but subject to the further limitation that when the R radical contains 2 carbon atoms, $R_1$ must be an aromatic or cycloaliphatic radical.

The tertiary amine-containing dicarboxylic acids which can be used can have the same basic structures except that the hydroxyl group will be replaced by a carboxyl group.

Some typical diols falling within the above classes include, e.g., bis(4-hydroxybutyl)ethylamine,
bis(2-hydroxyethyl)phenylamine,
bis(3-hydroxypropyl)propylamine, bis(2-hydroxypropyl)butylamine,
3-dimethylaminopentamethylenediol,
3-diethylaminohexamethylenediol,
N,N′-bis(3-hydroxypropyl)piperazine,
1,3-bis(N,N′-3-hydroxypropyl)piperazylpropane,
N,N′-bis(4-hydroxycyclohexyl)piperazine,
N-propyl 2,6-bis(2-hydroxyethyl)piperidine,
N-benzyl 2,6-bis(3-hydroxybutyl)piperidine,
N-cyclohexyl 2,4-bis(2-hydroxypropyl)piperidine,
1,4-bis(3-hydroxypropyl)-2-diethylaminocyclohexane,
1,3-bis(4-hydroxybutyl)-4-dipropylaminocyclohexane,
N-propyl-2,5-bis(3-hydroxypropyl)pyrollidine, and
N-ethyl-2,4-bis(β-hydroxyethyl)pyrollidine.

Any of the above alcohols or others fitting the descriptions set forth can be reacted with a conventional dicarboxylic acid having no tertiary amine nitrogen to form resinous polyesters having the tertiary amine group in the alcohol portion of the polymer. Examples of such dicarboxylic acids include such compounds as succinic acid, glutaric acid, suberic acid, azelaic acid, sebacic acid, terephthalic acid, hexahydroterephthalic acid and others.

These tertiary amine-containing diols can also be reacted with dicarboxylic acids containing tertiary amines to form resins having tertiary amine groups in both the acid and alcohol portions of the molecule. Exemplary dicarboxylic acids fitting the description hereinabove set forth include:

N,N-bis(3-carboxypropyl)ethylamine,
N,N-bis(4-carboxybutyl)butylamine,
3-diethylaminoadipic acid,
5-diethylaminosebacic acid,
N,N′-bis-(3-carboxypropyl)piperazine,
N,N′-bis-(4-carboxybutyl)piperazine,
N,N′-bis(2-carboxyethyl)piperazine,
2,6-bis-(3-carboxypropyl)N-methylpiperidine,
2,5-bis-(2-carboxyethyl)-N-ethylpiperidine,
2-diethylaminohexahydroterephthalic acid,
2-dipropylamino-1,4-bis(2-carboxyethyl)cyclohexane,
N-propyl-2,5-bis(2-carboxyethyl)pyrollidine.

These tertiary amine-containing dicarboxylic acids can also be reacted with diols containing no tertiary amine groups resulting in resins having the tertiary amine group located in the acid portion of the molecule only. Alcohols such as ethylene glycol, trimethylene glycol, 1,6-hexanediol, and 1,4-di(hydroxymethyl)cyclohexane, e.g., are useful in this type of resin.

The amount of basic amino polyester to be employed in the olefin polymer compositions according to the instant invention will vary, depending upon the use to be made of the compositions and upon the relative concentrations of the two functional groups—tertiary amino and ester—in the polyester molecule. In general, the compositions will contain 80 to 99.5% by weight of olefin polymer and 0.5 to 20% of the indicated amino polyester.

The aforementioned unique combination of properties, i.e., acid dyeability, disperse dyeability, and improved light stability imparted by the novel additive of this invention result from the presence in the resin molecule of both a polyester functionality and tertiary amino functionality. Disperse dyeability is believed to result from the presence of the polyester function since it is known that polyesters in general are disperse dyeable polymers. The acid dyeability is imparted by the tertiary amine group. The surprising feature of the invention, and the feature which would not have been obvious from prior knowledge is that the presence of the tertiary amine also contributes substantial light stability to the olefin polymer.

Since the utility of the additives can be traced to specific functional groups in its molecule, and since the concentration of each functional group varies with different resins, it is more convenient to specify the amount of additive required in terms of the amount of functional group, i.e., either tertiary amine nitrogen or carbonyloxy

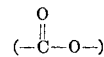

group provided thereby. It is found that the necessary concentration of either of these groups is about 0.1 to 1% for each service which it is expected to perform. Thus, the additive is added in amount to provide 0.1 to 1% of the carbonyloxy group. Since there are two possible services to be performed by the tertiary amine nitrogen, the same can be present in amount of 0.1 to 2%, the precise amount being determined by whether one or both of these services is desired. The precise amount of a specific resin necessary to provide the indicated concentrations of tertiary nitrogen and carbonyloxy functionality will vary according to its structure and molecular weight. It must, generally be within the indicated overall range in order not to have a deleterious effect on other properties of the olefin polymer.

To prepare compositions exhibiting the most favorable combination of properties, the preferred type of resins are those having at least two tertiary amine functional groups for each ester group. These are prepared, e.g., by using a combination of diol and dicarboxylic acid, each of which contains a tertiary amine group, or by using either a diol or dicarboxylic acid containing more than one tertiary amine group in combination with an ingredient having no amine groups. This type of resin can provide, at a minimum addition level, the requisite concentration of the two functional groups to provide for light stable polymers which can be dyed with either acid or disperse dyes, at the option of the user.

The basic amino polyesters can be added to any polymer of an α-olefin having 2 to about 6 carbon atoms. This includes both high and low density polyethylene, polypropylene, poly(butene-1), poly(4-methylpentene-1), poly(3-methylbutene-1), and poly(3-methylpentene-1). Copolymers of the above monomers can also be treated according to the invention. This includes both the crystalline copolymers of, e.g., ethylene and propylene or ethylene and butene-1 where the major monomer comprises about 85% or more of the copolymer as well as the amorphous rubbery copolymers where the major monomer comprises, e.g., about 50 to 85% of the total monomer. These latter can also contain a small fraction of a third monomer, a diene such as, e.g., dicyclopentadiene, ethylidene norbornene, norbornadiene, or 1,6-hexadiene, to introduce sulphur-vulcanizable points of unsaturation into the copolymer molecule.

The composition according to the invention can be employed in any of the applications where such polymers are normally employed. This includes, e.g., preparation of extruded and cast film, injection molding, compression molding, film preparation and in synthetic elastomer applications. In many of these applications, the dyeability characteristics are not critical, but they can be substantially improved in light stability by adding basic amino polyesters according to this invention. In other instances, light stability will be secondary to dyeability, but in many instances, both light stability and dyeability are desirable and in such cases, the present invention finds maximum value.

The amino polyesters can be incorporated into the polymer by any convenient method. For example, the dried, powdered polymers can be tumbled together, the powdered olefin polymer can be mixed into a solution of the polyester, or vice-versa, or they can be melt blended as on a compounding extruder, Banbury mixer, or the like. Uniform and intimate mixing can be faciiltated by the addition of dispersing agents, as for example, a surfactant.

The examples which follow demonstrate the dyeability and light stabiilty of typical compositions according to the present invention. Dyeability is expressed as the percent exhaustion of a standard dyebath after 2 hours immersion of the composition therein. The standard dyebath contains 2% dye, based on the weight of polymer composition to be dyed and having a liquor to polymer ratio of 100 to 1 by weight. Light stability of the polymer is expressed as the percentage of the initial tensile strength of the test specimen retained after specified periods of exposure to sunlight. The exposure period is expressed in langleys, the langley unit being one gram calorie of radiant energy per square centimeter. The specimens are usually tested in South Miami, Florida, where exposure from sunrise to sunset for about one month is equivalent to approximately 10,000 langleys in most months. Alternatively the stability can be expressed as the exposure period in langleys required to effect 100% reduction in tensile strength. Testing is accomplished, in the case of yarn, by weaving the same into a fabric with an acrylic warp, the weave being such that the olefin polymer is predominantly on the surface. This fabric is then supported in a rack, exposed to sunlight and sampled at 10,000 langley intervals and tensile tested. Sections of film are exposed and tested in like manner.

EXAMPLE 1

One molar portion (230 parts) of the dimethyl ester of piperazine-N,N'-diacetic acid and 2 molar portions (128 parts) ethylene glycol are charged to a reactor with 0.015 mole percent of zinc acetyl acetonate catalyst. The mass is heated to about 185° C. and held at that temperature at atmospheric pressure for about 6 hours until methanol evolution stops. The pressure in the kettle is then reduced to about 30 mm. of Hg. Over a period of about 1½ hours, the temperature is raised to about 260° C., while the pressure is reduced to about 0.5 mm. Polymerization is then continued for another six hours. A solid, brittle mass is recovered on cooling, which has a nitrogen content of about 10.2% by weight.

The polyester (1.9 parts) is incorporated into stereoregular polypropylene (98.1 parts) to form a composition having about 0.2% total nitrogen content by extrusion milling and extruded into filaments in a laboratory extruder.

When the filaments are dyed with Disperse Yellow 23 (CI 26070) in a 2% dyebath, liquor ratio of about 100 to 1, the dye is about 70% exhausted after 3 hours as measured by colorimeter. The filaments are dyed a very deep shade.

When the dyed filaments are subjected to atmospheric aging in sunlight, they retain 60% of their initial tensile strength after 50,000 langleys.

EXAMPLE 2

To a reaction vessel there is charged 272 parts of 1,3-bis(N-hydroxyethyl)piperidyl propane, 62 parts of ethylene glycol and 230 parts of dimethyl sebacate. This mass is heated to about 185° C. in the presence of a catalytic amount of zinc acetate for about 6 hours until evolution of methanol stops. At this point the temperature is gradually raised to about 250° C. and the pressure is then reduced to about 0.5 mm. Hg. Ethylene glycol is removed for a period of about 6 hours. Upon cooling, the polyester product is recovered as a friable, crystalline solid having nitrogen content of about 5.6% and is comprised substantially exclusively of sebacic acid and 1,3-bis(N-hydroxyethyl piperidine) units.

This polyester is incorporated into stereoregular polypropylene at the 10% level based on total weight to form a composition containing approximately 0.55% nitrogen. The modified polymer is extruded into filaments.

These filaments are dyed with Acid Green 25 (CI 61570) in a 2% dye bath, 100 to 1 liquor ratio to 80% dye exhaustion. Two hours are required. The filament is dyed to a medium deep color.

The dyed filaments are subjected to atmospheric aging in sunlight. After 50,000 langleys, the filaments retain 40% of their original tensile strength. Unprotected stereoregular polypropylene has virtually no tensile strength after 50,000 langleys.

Filaments based on the above composition are also dyed to deep shades with disperse dyes.

EXAMPLE 3

A polyester prepolymer is prepared by reacting 194 parts of dimethylterephthalate, 62 parts of ethylene glycol and 181 parts of N-phenyl diethanolamine at 180° C. at atmospheric pressure until methanol is no longer evolved. To this is added 4 moles per mole of a prepolymer based on DMT and ethylene glycol. These are heated to 150° C. and the pressure is reduced to 30 mm. Thereafter, the temperature is raised to 250° C. over a period of about 45 minutes and the pressure is reduced to 0.05 mm. over about 2 hours. Polymerization is continued for a total of about 5 hours. The product is a light yellow crystalline solid having nitrogen content of 1.29%.

A composition consisting of 90 parts polypropylene and 10 parts of the above polyester is spun into yarn. This yarn has an overall nitrogen content of about 0.13%. When it is dyed with Disperse Blue 73, a 2% dyebath is 70% exhausted after 2 hours. These dyed yarns retain 40% of their tensile strength after 50,000 langleys.

EXAMPLES 4 TO 7

Using the procedures set forth in Examples 1, 2 and 3 above, a series of polyester resins is prepared using different combinations of diol and dicarboxylic acid. These are incorporated into stereoregular polypropylene yarns which are then evaluated as to their dyeability and light stability. These tests are summarized in the following table:

| Ex. No. | Diol | Dicarboxylic acid | Percent N [1] | Acid dyeability [2] | Disperse Dyeability [2] | Light Stability [3] |
|---|---|---|---|---|---|---|
| 4 | 3-diethylamino-1,6-hexanediol | Adipic | 0.6 | 60 | 70 | 50 |
| 5 | Ethylene glycol | 3-diethylaminoadipic | 0.6 | 60 | 65 | 45 |
| 6 | 3-diethylamino-1,6-hexanediol | do | 0.5 | 60 | 60 | 60 |
| 7 | 1,3-bis(N-hydroxyethyl) piperidyl propane | Piperazine-N,N'-diacetic | 0.8 | 70 | 60 | 60 |

[1] Percent tertiary N in yarn.
[2] Dyeability as percent exhaustion of 2 percent dyebath, 100 to 1 liquor ratio, after two hours, Disperse Yellow 23 or Acid Red 37.
[3] Stability as percent tensile retention after 50,000 langleys.

EXAMPLE 8

A polyester resin based on 1,3-bis(N-hydroxyethyl)piperidyl propane and piperazine-N,N'-diacetic acid is incorporated into high density polyethylene at an additive level to yield 0.3% nitrogen in the total composition. The composition is injection molded into plaques of ⅛ inch thickness. These are exposed to sunlight to measure the degradative effect.

Degradation in thick sections of the sort here employed is not indicated by loss of tensile strength, but by chalking, crazing and general deterioration of the surface of the plaque. A specimen of conventionally stabilized polyethylene begins to exhibit substantial evidence of deterioration after about six months exposure. The specimen containing the instant amino polyester shows very little degradation after 9 months exposure.

EXAMPLE 9

Using the procedure described in Example 2, a polyester of N-phenyl diethanol amine and sebacic acid is prepared which contains about 3.6% N. This resin (8 parts) is incorporated into stereoregular polypropylene (92 parts) to form a composition containing 0.28% N. When this composition is injection molded into 1/8" plaques, the plaques show substantially no deterioration after about 9 months aging in sunlight.

EXAMPLE 10

A polyester resin is prepared using the procedure of Example 2, based on N,N'-bis(3-hydroxypropyl)piperazine and terephthalic acid, containing about 7.6% N. Two and one-half (2.5) parts of this resin is incorporated into 97.5 parts of a crystalline random copolymer of 97 mole percent propylene and 3 mole percent ethylene and a film is formed with the blend.

This film, after exposure to sunlight of 10,000 langleys, retains 50% of its initial tensile strength. By contrast, a control specimen containing a conventional light stabilizer, 0.5% of 2-hydroxy-4-octyloxy benzophenone retains only 10% of its original tensile strength after 10,000 langleys.

What I claim and desire to protect by Letters Patent is:

1. A blended composition of matter comprising 80 to 99.5% by weight of a polymer of an α-olefin having 2 to 6 carbon atoms and 0.5 to 20% by weight of a dicarboxylic acid-diol condensation polyester resin containing tertiary amino groups wherein said polyester is substantially water insoluble with a melting point below about 250° C. and wherein (a) the dicarboxylic acid groups must be separated by a minimum of 2 carbon atoms, (b) the hydroxyl groups of the diol must be separated by a minimum of 2 carbon atoms, and (c) the hydroxyl groups must be separated from the amine nitrogen by at least two carbon atoms, said blended composition containing, by weight based on total weight of the composition, 0.1 to 1% of carbonyloxy functionality and 0.1 to 2% of tertiary amine nitrogen.

2. The composition according to claim 1 where the olefin polymer is selected from the class consisting of polyethylene, polypropylene poly(4-methyl pentene-1), poly(3-methyl butene-1), and copolymers of ethylene and propylene.

3. The composition of claim 2 where the tertiary amine groups are located in the dicarboxylic acid portion of the polyester molecule.

4. The composition of claim 3 where the polyester resin is based upon a dicarboxylic acid derivative of piperazine.

5. The composition of claim 3 where the polyester resin is based upon an α,ω linear aliphatic dicarboxylic acid whose carboxyl groups are separated by at least 2 carbon atoms and which has a pendant tertiary mine group on at least one of said carbon atoms.

6. The composition of claim 2 where the tertiary amine groups are located in the diol portion of the polyester molecule.

7. The composition of claim 6 where the polyester resin is based upon a dihydroxy derivative of piperazine.

8. The composition of claim 6 where the resin is based upon a polymethylene glycol whose hydroxyl groups are separated by at least 2 carbon atoms and which has a pendant nitrogen group on at least one of said carbon atoms.

9. The composition of claim 6 where the resin is based upon a dialkanol amine having the formula

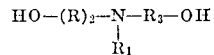

where $R_1$ is selected from the class consisting of aliphatic radicals of 2 to 13 carbon atoms, aromatic radicals and heterocyclic radicals and $R_2$ and $R_3$ are aliphatic radicals of at least 2 carbon atoms.

10. The composition of claim 2 where the polyester resin contains tertiary amine groups in both the dicarboxylic acid portion and the diol portion of its molecule.

11. The composition of claim 10 where the polyester resin is based upon piperazine derivatives for both the dicarboxylic acid and diol portions of its molecule.

12. The composition of claim 2 in the form of a fiber.

13. The composition of claim 2 in the form of a film.

References Cited

UNITED STATES PATENTS

| | | | |
|---|---|---|---|
| 3,234,156 | 2/1966 | Nimoy et al. | 260—873 |
| 3,256,362 | 6/1966 | Craubner et al. | 260—873 |
| 3,317,633 | 5/1967 | Tesoro et al. | 260—873 |
| 3,465,060 | 9/1969 | Oldham | 260—45.9 |

WILLIAM H. SHORT, Primary Examiner

E. WOODBERRY, Assistant Examiner

U.S. Cl. X.R.

260—45.9